(12) United States Patent
Marvin et al.

(10) Patent No.: US 11,791,677 B2
(45) Date of Patent: Oct. 17, 2023

(54) SCALABLE ROTOR

(71) Applicant: LC ADVANCED MOTOR TECHNOLOGY CORPORATION, New York, NY (US)

(72) Inventors: Russel Hugh Marvin, Potsdam, NY (US); Matthew Honickman, Potsdam, NY (US); Dylan Broomfield, Gansevoort, NY (US)

(73) Assignee: LC Advanced Motor Technology Corporation, New York, NY (US)

( * ) Notice: Subject to any disclaimer, the term of this patent is extended or adjusted under 35 U.S.C. 154(b) by 174 days.

(21) Appl. No.: 16/747,223

(22) Filed: Jan. 20, 2020

(65) Prior Publication Data
US 2021/0226490 A1 Jul. 22, 2021

(51) Int. Cl.
*H02K 1/27* (2022.01)
*H02K 15/03* (2006.01)
*H02K 1/276* (2022.01)
*H02K 1/30* (2006.01)

(52) U.S. Cl.
CPC ............... *H02K 1/276* (2013.01); *H02K 1/30* (2013.01); *H02K 15/03* (2013.01)

(58) Field of Classification Search
CPC .......... H02K 1/276; H02K 1/30; H02K 15/03; H02K 2213/03
See application file for complete search history.

(56) References Cited

U.S. PATENT DOCUMENTS

| 6,426,576 | B1 * | 7/2002 | Varenne | H02K 1/2773 |
| | | | | 310/156.09 |
| 9,837,881 | B2 * | 12/2017 | Schneider | H02K 1/2773 |
| 2007/0145849 | A1 | 6/2007 | Okamoto et al. | |
| 2008/0224558 | A1 * | 9/2008 | Ionel | H02K 1/2766 |
| | | | | 310/156.57 |
| 2010/0117475 | A1 | 5/2010 | Leonardi et al. | |
| 2010/0308680 | A1 * | 12/2010 | Yamada | H02K 1/2746 |
| | | | | 310/156.54 |
| 2011/0316382 | A1 | 12/2011 | Komada et al. | |
| 2013/0154434 | A1 | 6/2013 | Hasegawa | |
| 2013/0307364 | A1 | 11/2013 | Marvin et al. | |
| 2014/0103771 | A1 * | 4/2014 | Figgins | H02K 21/16 |
| | | | | 29/598 |
| 2014/0361657 | A1 | 12/2014 | Vohlgemuth | |
| 2017/0179779 | A1 * | 6/2017 | Kaiser | H02K 1/2766 |
| 2018/0069443 | A1 * | 3/2018 | Han | H02K 1/265 |
| 2020/0106314 | A1 * | 4/2020 | Schulde | H02K 1/276 |

FOREIGN PATENT DOCUMENTS

| JP | 2004248443 A | 9/2004 |
| JP | 3627559 B2 | 12/2004 |
| JP | 2014057430 A | 3/2014 |

\* cited by examiner

*Primary Examiner* — Thomas Truong
(74) *Attorney, Agent, or Firm* — Darrell G. Mottley

(57) ABSTRACT

A rotor stack for connection to a shaft of a rotary electric machine includes a series of platters each centered about a centerline and including an opening for receiving the shaft such that the platters are stacked along the shaft. Passages extend through the platter and are arranged about the centerline. Permanent magnets are positioned in the passages. Hubs associated with the platters mechanically connect each of the platters to the shaft.

25 Claims, 7 Drawing Sheets

SCALABLE ROTOR

TECHNICAL FIELD

The present invention relates generally to rotary electric machines, and specifically to a stackable platter for a rotor.

BACKGROUND

Permanent magnet motors are typically built by stacking the rotor steel laminations the full stack length of the rotor and then welding or riveting the laminations together. This allows for the best packing factor and stacking tolerance. It is often desirable to change the rotor stack length of a motor or generator to increase or decrease torque output. With this construction, however, the lamination assembly is different for every different length rotor.

When stacking laminations the full length of the rotor stack, magnet assembly can be problematic. For surface mount machines, the magnets need to be assembled next to each other where there are high magnetic forces. This can require gluing the magnets in place with strong glue or mechanically holding the magnets during assembly before a retaining sleeve is put on. Having to assemble the magnets this way while fighting strong magnetic forces can be difficult.

Assembling magnets into internal permanent magnet (IPM) rotors is also difficult when they are built full length because the magnets need to be inserted into the rotor holes and pushed the full length of the rotor. The high magnetic forces present make this assembly especially problematic. Furthermore, this method requires the magnets to be slip fit into the magnet holes and then glued in place with adhesives. The adhesives are weak and can eventually crack during assembly, which allows the magnets to move around. This can reduce magnetic and structural balance of the machine lowering performance.

SUMMARY

In one example, a rotor stack for connection to a shaft of a rotary electric machine includes a series of platters each centered about a centerline and including an opening for receiving the shaft such that the platters are stacked along the shaft. Passages extend through the platter and are arranged about the centerline. Permanent magnets are positioned in the passages. Hubs associated with the platters mechanically connect each of the platters to the shaft.

In another example, a rotor stack for connection to a shaft of a rotary electric machine includes a series of platters each centered about a centerline and including an opening for receiving the shaft such that the platters are stacked along the shaft. Inner surfaces define passages extending through the platter and arranged about the centerline. Permanent magnets are positioned in the passages. Each magnet includes a leading end having a tapered surface for engaging the inner surface to expand the passage and form a press-fit connection with the inner surface.

In another example, a subassembly for connection to a shaft of a rotary electric machine includes a platter centered about a centerline and having an opening for receiving the shaft. Inner surfaces define passages extending through the platter and arranged about the centerline. Permanent magnets are positioned in the passages and have a press-fit connection with the inner surfaces.

In another example, a method of forming a rotor stack for connection to a shaft of a rotary electric machine includes securing a first stack of laminations together to form a first platter centered about a centerline. The first platter includes an opening for receiving the shaft and passages arranged about the centerline. Permanent magnets are positioned in the passages of the first platter. The first platter is mechanically secured to the shaft with a first hub. A second stack of laminations is secured together to form a second platter centered about a centerline. The second platter includes an opening for receiving the shaft and passages arranged about the centerline. Permanent magnets are positioned in the passages of the second platter. The second platter is mechanically secured to the shaft with a second hub such that the first and second platters are stacked along the shaft.

In another example, a method of forming a rotor stack for connection to a shaft of a rotary electric machine includes securing a first stack of laminations together to form a first platter centered about a centerline. The first platter includes an opening for receiving the shaft and passages arranged about the centerline. The first platter is mechanically secured to the shaft with a first hub. Permanent magnets are positioned in the passages of the first platter. A second stack of laminations is secured together to form a second platter centered about a centerline. The second platter includes an opening for receiving the shaft and passages arranged about the centerline. The second platter is mechanically secured to the shaft with a second hub such that the first and second platters are stacked along the shaft. Permanent magnets are positioned in the passages of the second platter.

In another example, a rotor stack for connection to a shaft of a rotary electric machine includes a first stack of laminations mechanically secured together to form a first platter centered about a centerline. The first platter has an opening for receiving the shaft and passages arranged about the centerline. A second stack of laminations is mechanically secured together to form a second platter centered about a centerline. The second platter has an opening for receiving the shaft and passages arranged about the centerline. The first and second platters are rotatably secured to the shaft and free of direct connection to one another. Permanent magnets are positioned in the passages of the first and second platters.

Other objects and advantages and a fuller understanding of the invention will be had from the following detailed description and the accompanying drawings.

DETAILED DESCRIPTION

Figure 1:
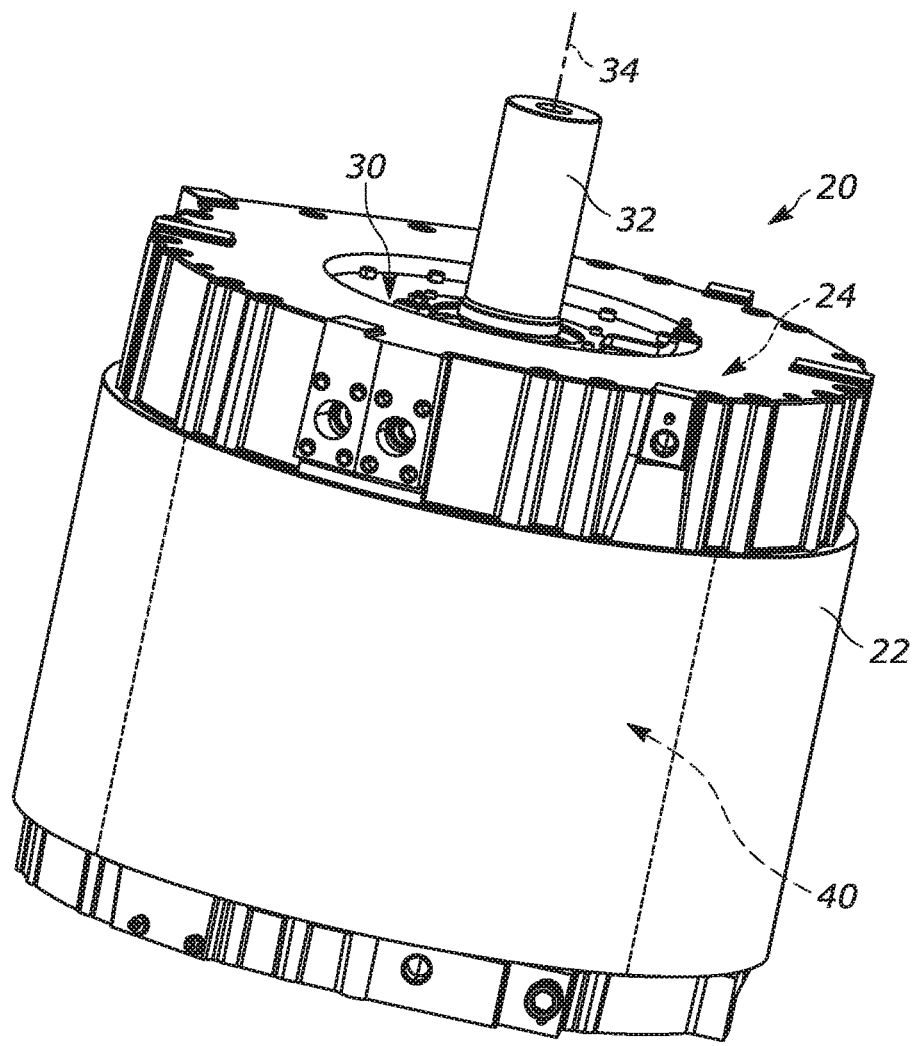
FIG. 1 is a schematic illustration of a rotary electric machine including an example rotor stack.
Figure 2:
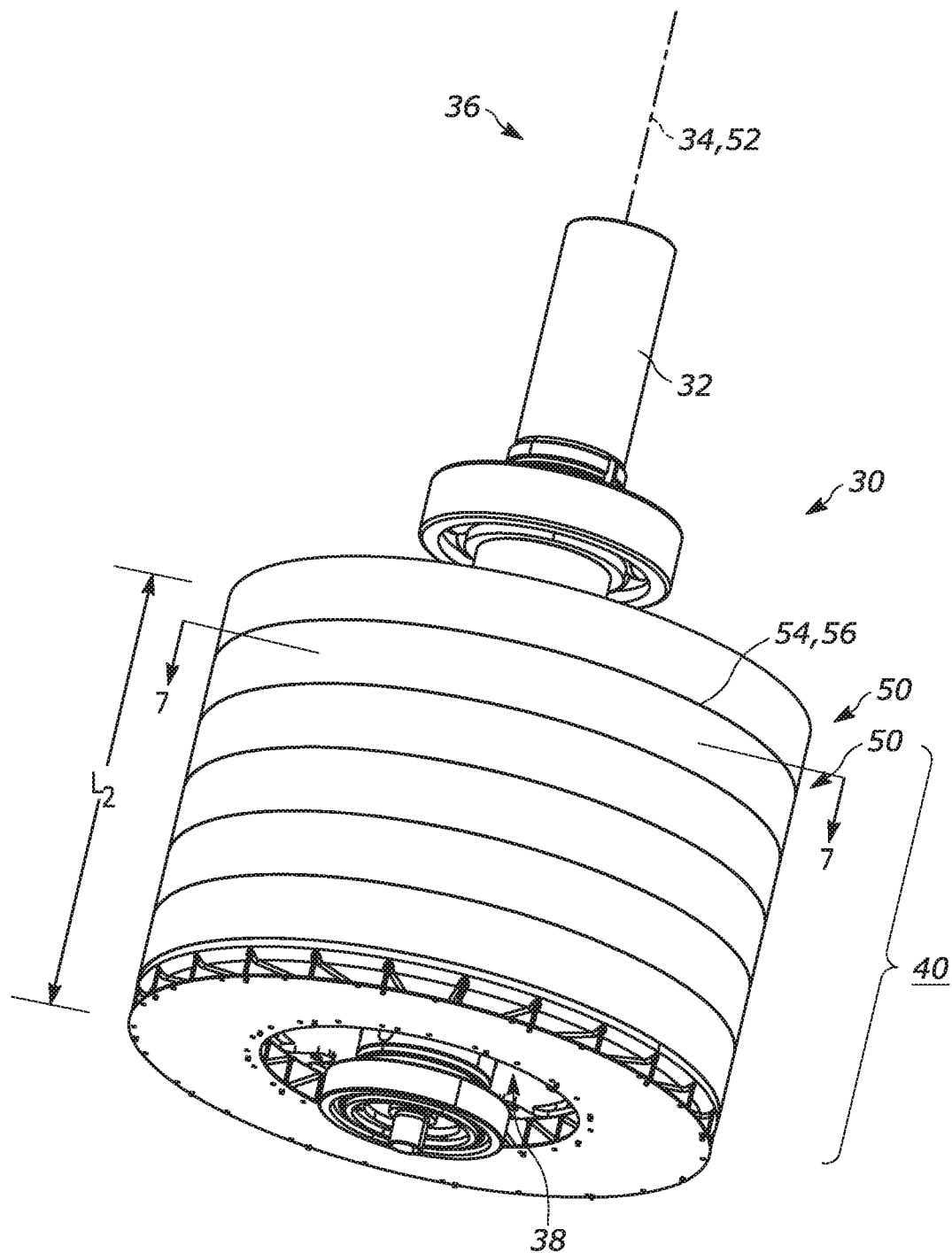
FIG. 2 is a front view of the rotor stack of FIG. 1.

The present invention relates generally to rotary electric machines, and specifically to a stackable platter for a rotor. Referring to FIGS. 1-2, the rotary electric machine 20 includes a stator 22 having a passage 24 for receiving a rotor assembly 30 rotatable within and relative to the stator. The rotor assembly 30 includes a shaft 32 and a rotor stack 40 secured to the shaft and rotatable therewith. The shaft 32 extends along an axis 34 from a first end 36 to a second end 38.

Figure 3:
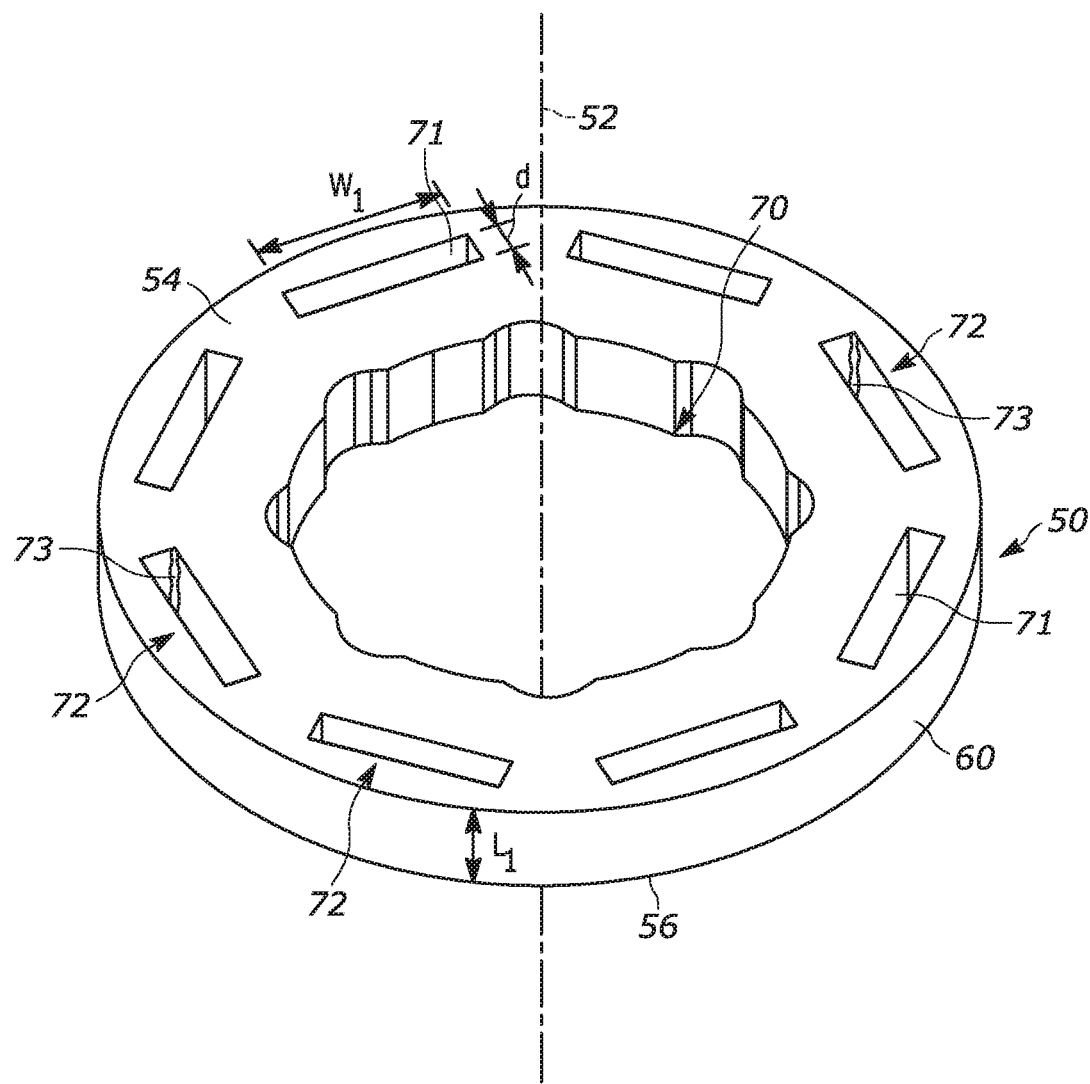
FIG. 3 is a top view of a platter of the rotor stack.

As shown in FIG. 2, the rotor stack 40 includes a series of platters 50 stacked atop one another along the axis 34. Each platter 50, in turn, is formed from a series of stacked, metallic laminations held together. Each platter 50 (FIG. 3) is round, e.g., circular, and extends about a centerline 52. The platter 50 includes opposing first and second axial end surfaces 54, 56. An annular surface 60 extends circumferentially about the centerline 52. An opening 70 extends between the end surfaces 54, 56 through the entire platter 50. The opening 70 is configured to receive the shaft 32.

Inner surfaces 71 define passages 72 extending between the end surfaces 54, 56 and through the entire platter 50. The passages 72 are spaced entirely from the annular surface 60. The passages 72 are symmetrically arranged about the opening 70 and collectively encircle the centerline 52. Alternatively, the passages 72 can be arranged in pairs about the opening 70 with each pair being v-shaped and pointing towards the opening (not shown).

In one example, at least one weld bead 73 is made in at least one passage 72 along the length $L_1$ of the passage to secure the stacked laminations together and form the individual platter 50. More specifically, the weld bead 73 can be formed in one or more corners of at least one passage 72 (as shown) or anywhere else along the inner surface 71 defining each passage (not shown). Alternatively or additionally, the stacked laminations can be secured together by riveting, mechanical interlock and/or by being mechanically clamped together. In any case, the stacked laminations are secured together in a manner that electrically shorts them with one another and forms the individual platter 50.

As shown, the passages 72 have a width $W_1$ extending generally about the centerline 52. Each passage 72 has a radial depth d extending perpendicular to the width $W_1$. The length $L_1$ of the passage is defined between the axial end surfaces 54, 56 end equivalent to the depth or thickness of the platter 50. The weld beads 73, when provided, can be located, for example, at opposite circumferential extents of the width $W_1$ of the passage(s) 72.

Figure 4:
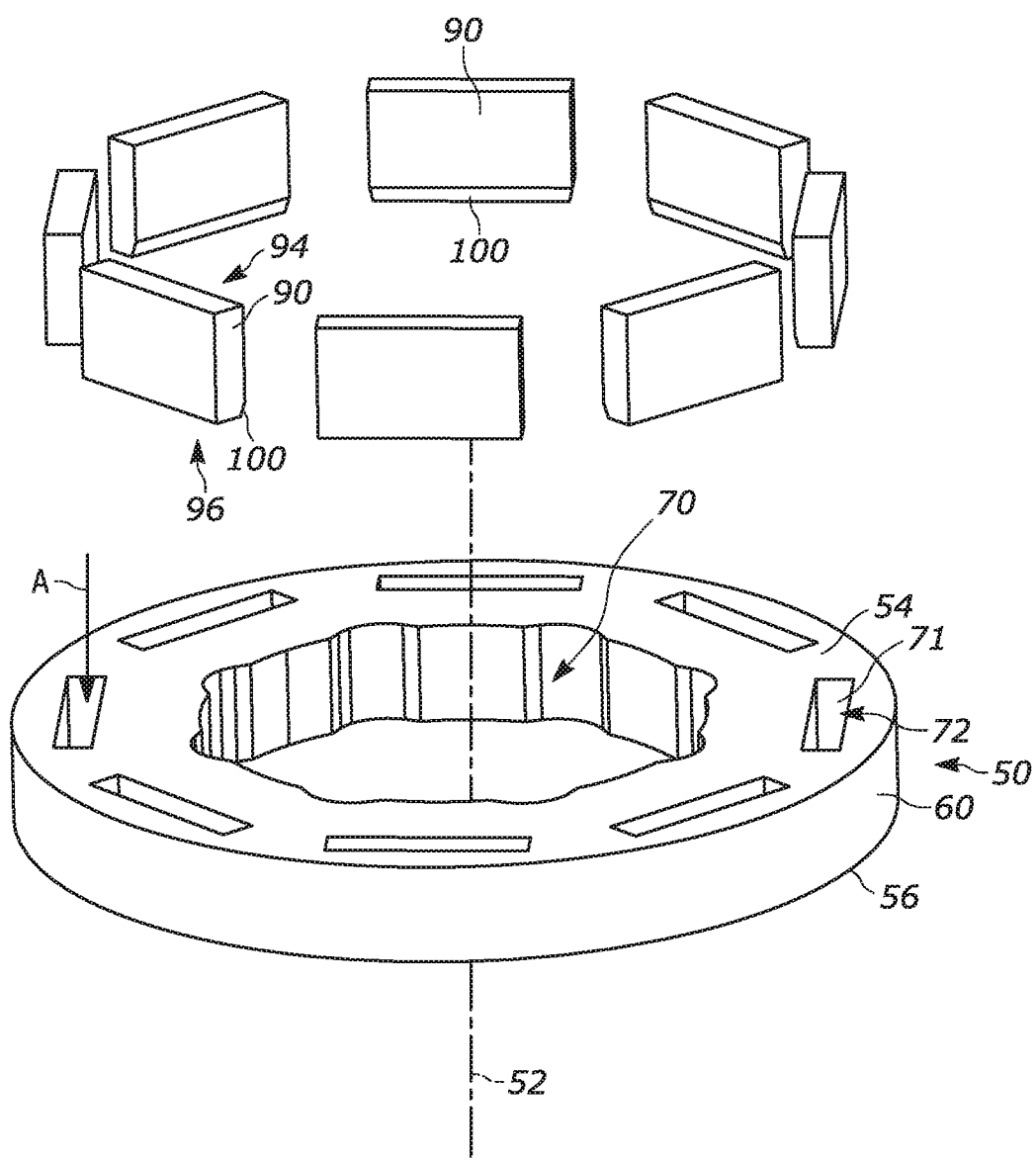
FIG. 4 is an exploded view of the platter and magnets of the rotor stack.
Figure 5A:
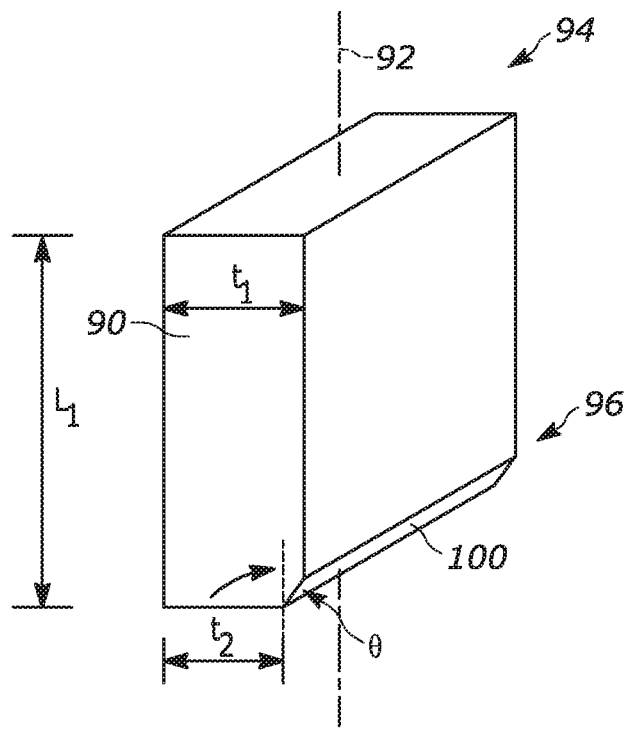
FIG. 5A is a front view of the magnet of FIG. 4.
Figure 5B:
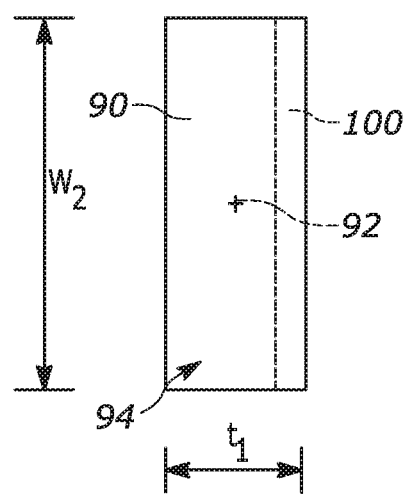
FIG. 5B is a top view of the magnet of FIG. 5A.

As shown in FIG. 4, a permanent magnet 90 is positioned in each passage 72. The permanent magnets 90 can be formed from, for example, rare earth materials (e.g., Samarium Cobalt and Neodynium) or ceramic materials (e.g., ferritic) and are coated with or other exhibit a metallic outer surface. Referring further to FIGS. 5A-5B, each permanent magnet 90 extends along a longitudinal centerline 92 from a first end 94 to a second end 96. The length $L_1$ is defined between the first and second ends 94, 96 and, thus, the magnets 90 and passages 72 have substantially the same length $L_1$. In other words, the magnets 90 and platter 50 have substantially the same length in the direction of the centerline 52. The length of the magnet 90, however, could be less than the length of the platter 50 (not shown).

The width $W_2$ extends perpendicular to the centerline 92. The thickness t also extends perpendicular to the centerline 92. The width $W_2$ is greater than the thickness t. The ratio between the length $L_1$ and the width $W_2$ can be about 4:1 or less. The ratio between the length $L_1$ and the thickness $t_1$ can be about 4:1 or less. The width $W_2$ can be less than the width $W_1$ of the passage 72.

The second end 96 includes at least one tapered or angled surface 100 that extends at an angle θ relative to the direction of the length $L_1$. In the case of the rectangular magnet 90 shown, the second end 96 can therefore include up to four tapered surfaces 100 (not shown). The angle θ of each tapered surface 100 can be about 45° or less, e.g., about 10°. Regardless of the number of tapered surfaces 100, the magnet 90 has a constant first thickness $t_1$ spaced from the tapered surface(s) and a variable second thickness $t_2$ at/along the tapered surface(s). The second thickness $t_2$ is less than the first thickness $t_1$. The first thickness $t_1$ is greater than the radial depth d of the passages 72. The second thickness $t_2$ is less than the radial depth d of the passages 72.

Referring to FIG. 4, the magnets 90 are aligned with the passages 72 with the seconds ends 96 facing the first axial end surface 54. The second ends 96 therefore act as leading ends of the magnets 90. The tapered surface 100 of each magnet 90 can face away from the centerline 52 (as shown) or towards the centerline (not shown). In any case, the widths $W_1$, $W_2$ of the passage 72 and the associated magnet 90 are aligned with one another.

Figure 6B:
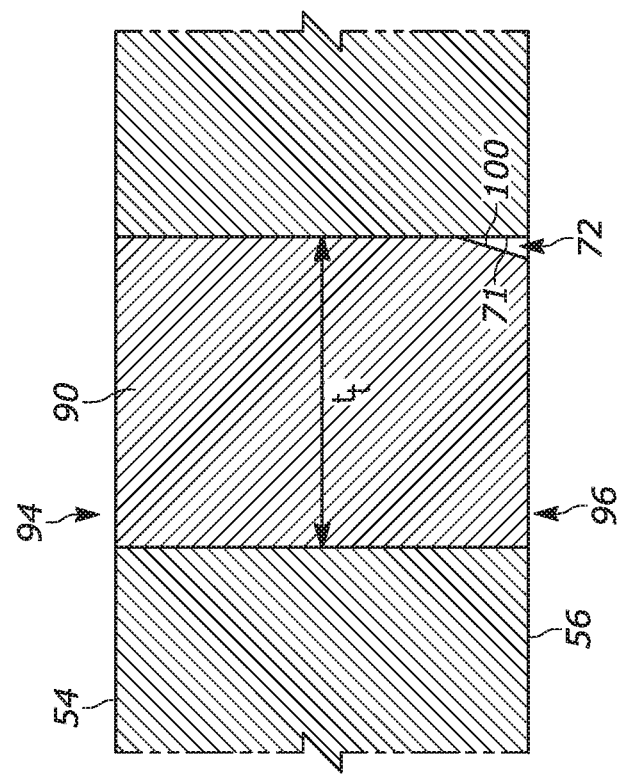
FIGS. 6A-6B are section views showing installation of the magnets into the platter.
Figure 6A:
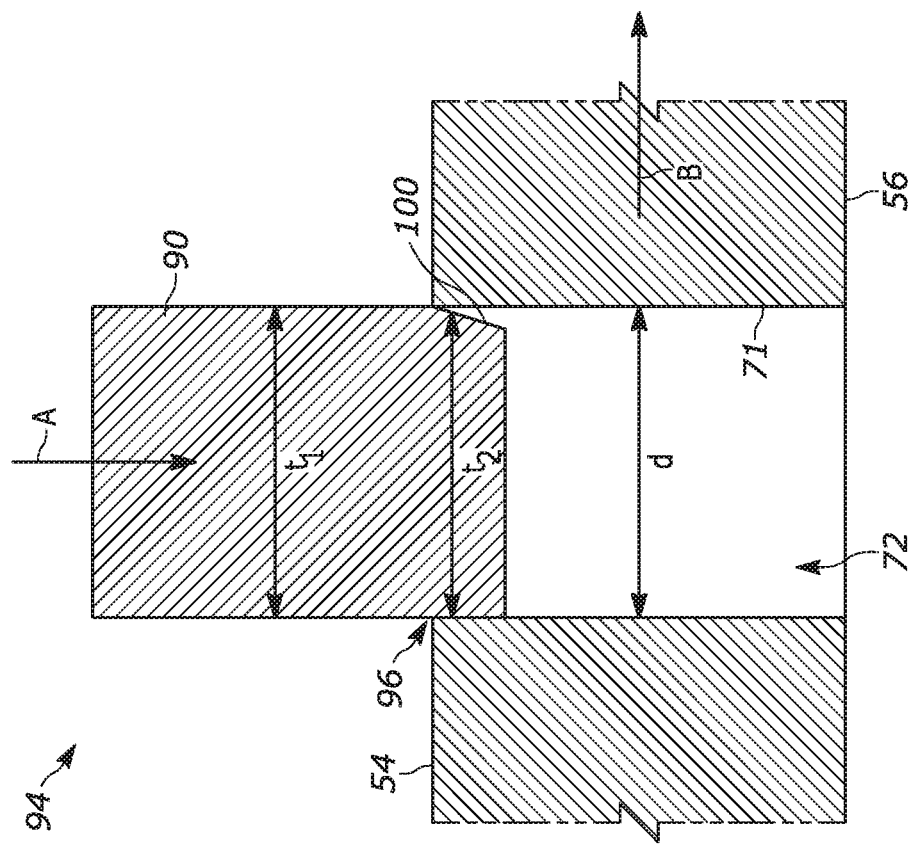

The magnets 90 are inserted into the respective passages 72 in the manner indicated by the arrow A in FIG. 6A. This positioned the centerlines 92 parallel to the centerline 52. The lower second thickness $t_2$ of the second ends 96 due to the at least one tapered surface 100 allows the second ends to readily pass into the passages 72. At or near the termination of the tapered surface 100, however, the magnet 90 abuts the intersection between the inner surface 71 and the axial end surface 54 of the platter 50 because its thickness $t_1$ at that point is greater than the radial depth d of the passage 72. In other words, there is initially an overlap between the magnet 90 and the inner surface 71.

That said, a force is applied to the magnets 90 sufficient to urge the magnet further in the direction A relative to the platter 50. This increased force causes the inner surface 71 to expand or move outward from the magnet 90 in the manner indicated by the arrow B. The inner surface 71 moves outward until the passage 72 expands sufficient to allow the entire magnet 90 to move into the passage. In other words, the expanded radial depth d of the passages 72 is equal to the first thickness $t_1$ of the magnets. Consequently, the passages 72 have a first condition sized smaller than the first thickness $t_1$ of the magnets 90 and a second, expanded condition sized to the first thickness in response to expanding the inner surfaces 71 of the passages with the magnets. The expanded inner surface 71 forms a press-fit connection between the platter 50 and the magnets 90 and thereafter applies a compressive force thereto. The magnets 90 are therefore frictionally held in place within the platter 50 due to the press-fit connections.

It will be appreciated that the magnets 90 can electrically short the laminations together along their entire length $L_1$. That said, the location of the weld 73, rivet, etc. can be configured to be positioned adjacent to or in close proximity with the location(s) at which the magnets 90 electrically short the laminations together. This helps to reduce or eliminate electrically conductive loops for eddy currents to flow between the magnet 90 shorts and the lamination connection (weld, rivet, etc.).

Although a single magnet 90 is shown positioned within each passage 72 it will be appreciated that multiple magnets can be press-fit into one or more of the passages from opposite sides of the platter 50 (not shown). The magnet(s) 90 in each passage can occupy the entire length $L_1$ of the platter 50 or less than the entire length (not shown).

The configuration of the magnets 90 and platter 50 is advantageously tailored to facilitate the press-fit connections therebetween. First, the aspect ratio of the magnets provides structural integrity compared to magnets having greater lengths than widths. Second, using the tapered surface 100 of each magnet 90 to act as a leading edge reduces the initial stress on the magnets and facilitates the inner surface 71 expansion by acting as a wedge. To this end, the reduced thickness $t_2$ of the magnet 90 at the tapered surface(s) 100 allows the second end 96 to pass freely into the passage 72 and gradually form the press-fit connection therein as the thickness increases to the termination of the tapered surface.

Although one example arrangement for the magnets 90 in the platter 50 is shown it will be appreciated that the magnets can be arranged in any manner typical or known in interior permanent magnet rotor designs. Moreover, the magnets can have any shape consistent with such configurations so long as the magnets are sized to be press-fit into the passages in the platters.

That said, the magnet 90 insertion process is repeated for each of the platters 50 such that the magnetic poles alternate circumferentially around the opening 70, e.g., N-S-N-S. It will be appreciated that when the magnets 90 are arranged in pairs each pair will have the same magnetic field direction and adjacent pairs will alternative polarity circumferentially around the opening 70 (not shown). Regardless, the platters 50 are then stacked atop one another until the rotor stack 40 reaches a desired length $L_2$ along the shaft 32 (see FIG. 2). Each platter 50 is rotationally oriented such that the magnets 90 on each platter are aligned with one another, thereby stacking the magnets atop one another along the length $L_2$.

Figure 7:
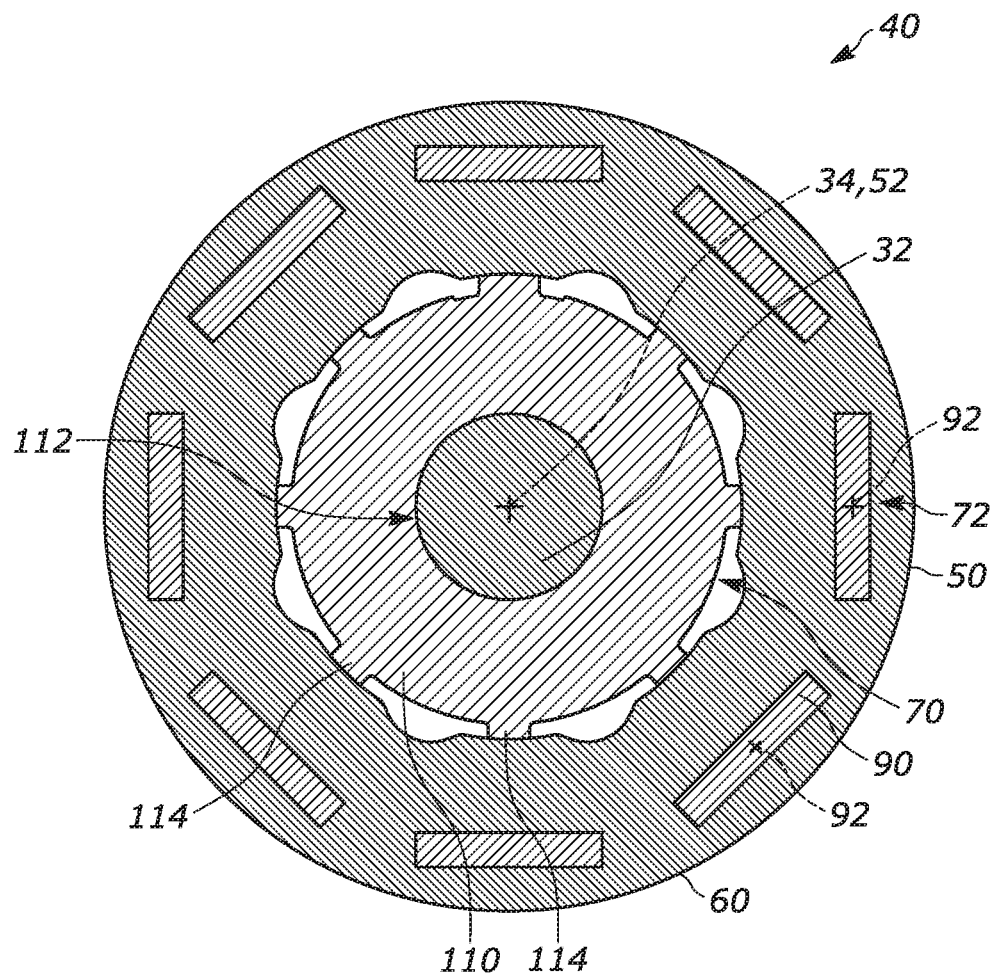
FIG. 7 is a section view taken along line 7-7 of FIG. 1.

The platters 50 are fixed for rotation with the shaft 32 and circumferentially aligned with one another such that the magnetic field directions of the magnets 90 are substantially aligned between platters. In other words, N-oriented magnets 90 are longitudinally stacked atop one another and S-oriented magnets are longitudinally stacked atop one another. In one example shown in FIG. 7, a hub 110 secures the shaft 32 to each platter 50 in the rotor stack 40. In other words, each platter 50 has a separate, individual hub 110 associated therewith. The hub 110 includes a passage 112 through which the shaft 32 extends. Projections 114 extend radially outward relative to the passage 112 and engage the surfaces of the platters 50 defining the openings 70. The connection between the hub 110 and the platters 50 is configured to enable torque transmission therebetween and, thus, additional features—such as key slots of the like (not shown)—can be provided to help prevent relative rotation between the hub and platters.

Each hub 110 can be mechanically coupled or secured, e.g., via press-fit connection, to the shaft 32 and the platters 50 such that the shaft, hubs, and rotor stack 40 rotate together about the axis 34. The platters 50 are secured to the hubs 110 in a stacked manner but not directly secured to one another. In other words, the platters 50 are not welded or mechanically fastened/connected directly to one another. In this configuration, the axis 34 of the shaft 32 extends parallel to the centerlines 92 of the magnets 90.

The stackable rotor assembly of the present invention is advantageous for several reasons. First, constructing the rotor assembly as a series of separate/modular platters stacked on top of another allows the stack to be readily configured for any length rotor shaft. The platters are identical and, thus, the number of platters can easily be adjusted depending on the application to meet the specific sized rotor assembly.

The stacked platter arrangement is advantageous in that the magnets are not aligned with or contact one another until the platters abut one another. By this time, however, the magnets are already securely fastened within the passages and, thus, relative movement between the magnets and platters in response to magnet interaction is prevented.

Moreover, providing a press-fit between the magnets and the platter alleviates concerns about adhesives cracking or otherwise failing during use of the motor, which would undesirably allow for relative movement between the magnets and the platter.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A rotor stack for connection to a shaft of a rotary electric machine, comprising:
   a series of platters each centered about a centerline and including an opening for receiving the shaft such that the platters are stacked along the shaft, wherein passages extend through the platter and are arranged about the centerline;
   permanent magnets positioned within the passages in abutted engagement therein, wherein a length of each permanent magnet is substantially the same as a length of its respective passage in a direction along the centerline;
   wherein each permanent magnet includes a leading end having a tapered rectilinear surface extending at an angle of 10° relative the length of the permanent magnet, and the leading end having an opposing perpendicular edge; and
   each platter associated with a respective hub separate therefrom, each respective hub securing each platter to the shaft via one or more projections that extend radially outward and engage a surface of the respective associated platter.

2. The rotor stack recited in claim 1, wherein the platters abut one another.

3. The rotor stack recited in claim 1, wherein the magnets have press-fit connections with inner surfaces defining the passages.

4. The rotor stack recited in claim 3, wherein each magnet includes the leading end for engaging the inner surface to expand the passage and form the press-fit connection with the inner surface.

5. The rotor stack recited in claim 1, wherein each platter includes an annular surface extending about the centerline, each magnet being spaced radially inwardly from the annular surface.

6. The rotor stack recited in claim 1, wherein each magnet extends along a centerline parallel to the axis of the shaft, the magnet having a length extending parallel to the centerline and a thickness extending perpendicular to the centerline.

7. The rotor stack recited in claim 6, wherein the thickness of each magnet is greater than a depth of the passage receiving the magnet.

8. The rotor stack recited in claim 1, wherein each platter comprises a stack of laminations secured together through at least one of the passages.

9. The rotor stack recited in claim 8, wherein the laminations have a welded connection with one another.

10. The rotor stack recited in claim 8, wherein the laminations are mechanically held against one another.

11. The rotor stack recited in claim 1, wherein a width of each permanent magnet extends perpendicular to the centerline.

12. The rotor stack recited in claim 11, wherein the ratio between the length and the width of each permanent magnet is approximately 4:1.

13. A rotor stack for connection to a shaft of a rotary electric machine, comprising:
   a series of platters each centered about a centerline and including an opening for receiving the shaft such that the platters are stacked along the shaft, wherein inner surfaces define passages extending through the platter and arranged about the centerline;
   permanent magnets positioned in the passages in abutted engagement of the inner surfaces, each magnet including a leading end having a tapered surface for engaging the inner surface to expand the passage and form a press-fit connection with the inner surface; and
   wherein:
      a length of each permanent magnet is substantially the same as a length of its respective passageway in a direction along the centerline,
      each platter comprises a stack of laminations secured together through at least one of the passages,
      the laminations have a welded connection with one another in each given stack of laminations,
      each of the welded connections contacted by one or more of the permanent magnets to electrically short the laminations together along the length of each platter;
      each permanent magnet includes a leading end having a tapered rectilinear surface extending at an angle of 10° relative the length of the permanent magnet, and the leading end having an opposing perpendicular edge.

14. The rotor stack recited in claim 13, wherein each platter includes an annular surface extending about the axis, each magnet being radially spaced inwardly from the annular surface.

15. The rotor stack recited in claim 13, wherein each magnet extends along a centerline parallel to the axis of the shaft, the magnet having a length extending parallel to the centerline and a thickness extending perpendicular to the centerline.

16. The rotor stack recited in claim 15, wherein the thickness of each magnet is greater than a depth of the passage receiving the magnet.

17. A subassembly for connection to a shaft of a rotary electric machine, comprising:
   a platter centered about a centerline and including an opening for receiving the shaft, wherein inner surfaces define passages extending through the platter and arranged about the centerline;
   each platter associated with a respective hub separate therefrom, each respective hub securing each platter to the shaft via one or more projections that extend radially outward and engage a surface of the respective associated platter; and
   permanent magnets positioned in the passages and having a press-fit connection with the inner surfaces,
   wherein a length of each permanent magnet is substantially the same as a length of its respective passageway in a direction along the centerline;
   wherein each permanent magnet includes a leading end having a tapered rectilinear surface extending at an angle of 10° relative the length of the permanent magnet, and the leading end having an opposing perpendicular edge.

18. The subassembly recited in claim 17, wherein each magnet includes a leading end having a tapered surface for engaging the inner surface to expand the passage and form a press-fit connection with the inner surface.

19. The subassembly recited in claim 17, wherein each platter includes an annular surface extending about the centerline, each magnet being spaced radially inwardly from the annular surface.

20. The subassembly recited in claim 17, wherein each magnet extends along a centerline parallel to the axis of the shaft, the magnet having a length extending parallel to the centerline and a thickness extending perpendicular to the centerline.

21. The subassembly recited in claim 17, wherein a thickness of each magnet is greater than a depth of the passage receiving the magnet.

22. The subassembly recited in claim 17, wherein each platter comprises a stack of laminations secured together through at least one of the passages.

23. A method of forming a rotor stack for connection to a shaft of a rotary electric machine, comprising:
   securing a first stack of laminations together to form a first platter centered about a centerline, the first platter including an opening for receiving the shaft and passages arranged about the centerline;
   positioning permanent magnets in the passages of the first platter;
   mechanically securing the first platter to the shaft with a first hub separate from the first platter, the first hub securing the first platter to the shaft via one or more first projections that extend radially outward from the first hub and engage a first surface of the first platter;
   securing a second stack of laminations together to form a second platter centered about a centerline, the second platter including an opening for receiving the shaft and passages arranged about the centerline;
   positioning permanent magnets in the passages of the second platter; and
   mechanically securing the second platter to the shaft with a second hub such that the first and second platters are stacked along the shaft, the second hub separate from the second platter and securing the second platter to the shaft via one or more second projections that extend radially outward from the second hub and engage a second surface of the second platter,
   wherein a length of each permanent magnet is substantially the same as a length of its respective passageway in a direction along the centerline; wherein each permanent magnet includes a leading end having a tapered rectilinear surface extending at an angle of 10° relative the length of the permanent magnet, and the leading end having an opposing perpendicular edge.

24. A method of forming a rotor stack for connection to a shaft of a rotary electric machine, comprising:
   securing, via at least one weld bead, a first stack of laminations together to form a first platter centered about a centerline, the first platter including an opening for receiving the shaft and passages arranged about the centerline;
   mechanically securing the first platter to the shaft with a first hub separate from the first platter, the first hub securing the first platter to the shaft via one or more first projections that extend radially outward from the first hub and engage a first surface of the first platter;

positioning permanent magnets in the passages in abutted engagement therein of the first platter;

securing, via at least one weld bead, a second stack of laminations together to form a second platter centered about a centerline, the second platter including an opening for receiving the shaft and passages arranged about the centerline;

mechanically securing the second platter to the shaft with a second hub such that the first and second platters are stacked along the shaft, the second hub separate from the second platter and securing the second platter to the shaft via one or more second projections that extend radially outward from the second hub and engage a second surface of the second platter;

and positioning permanent magnets in the passages of the second platter, wherein each permanent magnet includes a leading end having a tapered rectilinear surface extending at an angle of 10° relative the length of the permanent magnet, and the leading end having an opposing perpendicular edge.

25. A rotor stack for connection to a shaft of a rotary electric machine, comprising:

a first stack of laminations mechanically secured together via a first welded connection to form a first platter centered about a centerline, the first platter having an opening for receiving the shaft and passages arranged about the centerline;

a second stack of laminations mechanically secured together via a second welded connection to form a second platter centered about a centerline, the second platter having an opening for receiving the shaft and passages arranged about the centerline, wherein the first and second platters are rotatably secured to the shaft and without being directly secured to one another; and wherein:

each passage is configured to receive one of a plurality of permanent magnets in abutted engagement therein, at least one of the plurality of permanent magnets in the first platter contact the first welded connection to electrically short the first stack laminations together along the length of the first platter, and at least one of the pluralities of permanent magnets in the second platter contact the second welded connection to electrically short the second stack laminations together along the length of the second platter, a length of each permanent magnet is substantially the same as a length of its respective passageway in a direction along the centerline; wherein each permanent magnet includes a leading end having a tapered rectilinear surface extending at an angle of 10° relative the length of the permanent magnet, and the leading end having an opposing perpendicular edge.

\* \* \* \* \*